US011535021B2

(12) United States Patent
Böker

(10) Patent No.: US 11,535,021 B2
(45) Date of Patent: Dec. 27, 2022

(54) METHOD FOR PRODUCING LAMINATION STACKS AND APPLICATION DEVICE FOR AN ADHESIVE FOR PERFORMING THE METHOD

(71) Applicant: Kienle + Spiess GmbH, Sachsenheim (DE)

(72) Inventor: Björn Böker, Esslingen (DE)

(73) Assignee: Kienle + Spiess GmbH, Sachsenheim (DE)

(*) Notice: Subject to any disclaimer, the term of this patent is extended or adjusted under 35 U.S.C. 154(b) by 410 days.

(21) Appl. No.: 16/391,475

(22) Filed: Apr. 23, 2019

(65) Prior Publication Data

US 2019/0322093 A1   Oct. 24, 2019

(30) Foreign Application Priority Data

Apr. 23, 2018   (DE) .................. 10 2018 003 345.8

(51) Int. Cl.
*B32B 37/12* (2006.01)
*B32B 37/18* (2006.01)
*B32B 38/04* (2006.01)
*C09J 5/06* (2006.01)
(Continued)

(52) U.S. Cl.
CPC .......... *B32B 37/1207* (2013.01); *B32B 37/18* (2013.01); *B32B 38/04* (2013.01); *C09J 5/06* (2013.01); *H02K 15/02* (2013.01); *H02K 15/12* (2013.01); *B32B 2038/042* (2013.01);
(Continued)

(58) Field of Classification Search
CPC ..... B32B 37/1207; B32B 37/18; B32B 38/04; B32B 2038/042; B32B 2309/04; B32B 2457/00; B32B 2037/1253; C09J 5/06; C09J 2301/416; H02K 15/02;
(Continued)

(56) References Cited

U.S. PATENT DOCUMENTS 6,737,784 B2 * 5/2004 Lindquist ............. H02K 1/02
310/216.004
2005/0017587 A1 * 1/2005 Koenig ................. H02K 1/278
310/156.19
(Continued)

FOREIGN PATENT DOCUMENTS

CN         1966274       5/2007
CN       104203425      12/2014
(Continued)

*Primary Examiner* — Francisco W Tschen
*Assistant Examiner* — Abhishek A Patwardhan
(74) *Attorney, Agent, or Firm* — Gudrun E. Huckett

(57) ABSTRACT

In a method for producing a lamination stack for rotors and/or stators of electric motors or generators, laminations are punched from electrical steel, a light-activated adhesive is applied to at least one side of the laminations, respectively, and the adhesive is irradiated and activated with a light of a required wavelength immediately before the adhesive exits from an application unit. The laminations are then stacked to a lamination stack. An adhesive application device for carrying out the method has at least one application unit with at least one valve for discharging an adhesive. At least one radiation source is arranged in a region of the valve and emits a radiation and directs the radiation to the adhesive provided in the region of the at least one valve.

16 Claims, 5 Drawing Sheets

(51) Int. Cl.
*H02K 15/02* (2006.01)
*H02K 15/12* (2006.01)

(52) U.S. Cl.
CPC ....... *B32B 2309/04* (2013.01); *B32B 2457/00* (2013.01); *C09J 2301/416* (2020.08)

(58) Field of Classification Search
CPC .. H02K 15/12; B05C 5/00; B05C 9/04; B05C 11/10; B05C 11/1042; B05D 3/142
See application file for complete search history.

(56) References Cited

U.S. PATENT DOCUMENTS

| | | |
|---|---|---|
| 2006/0066168 A1* | 3/2006 | Shoykhet ............... H02K 15/12 310/211 |
| 2006/0257575 A1 | 11/2006 | Macor et al. |
| 2007/0065582 A1 | 3/2007 | Haack et al. |
| 2007/0115309 A1 | 5/2007 | Miura et al. |
| 2008/0003374 A1 | 1/2008 | Borra et al. |
| 2010/0193120 A1 | 8/2010 | Matsuo |
| 2013/0162064 A1 | 6/2013 | Kim et al. |
| 2015/0207366 A1 | 7/2015 | Burkhardt |
| 2016/0141942 A1* | 5/2016 | Boker .................... H02K 15/02 29/596 |
| 2017/0297078 A1 | 10/2017 | Nishinaka |

FOREIGN PATENT DOCUMENTS

| | | | |
|---|---|---|---|
| CN | 106890775 | 6/2017 | |
| DE | 10 2012 001 744 | 8/2013 | |
| DE | 102012001744 A1 * | 8/2013 | ............. B32B 15/00 |
| EP | 1 074 307 | 2/2001 | |
| EP | 1074307 B1 * | 6/2008 | ........... B29C 67/246 |
| JP | 2016 140134 | 8/2016 | |

* cited by examiner

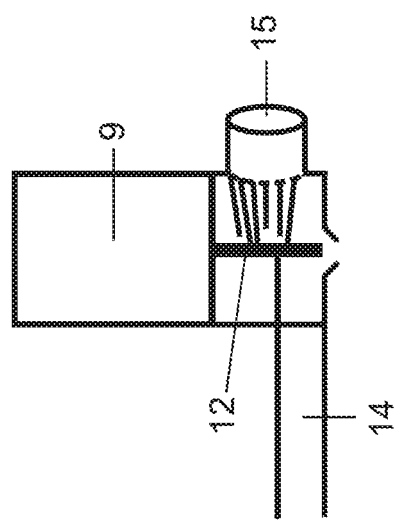

METHOD FOR PRODUCING LAMINATION STACKS AND APPLICATION DEVICE FOR AN ADHESIVE FOR PERFORMING THE METHOD

BACKGROUND OF THE INVENTION

The invention relates to a method for producing a lamination stack (laminated core) for rotors and/or stators of electric motors or generators, in which laminations are punched, adhesive is applied to at least one side of the lamination, and the laminations are stacked to a lamination stack (laminated core). The invention further relates to a device for application of an adhesive for carrying out the aforementioned method.

Laminated cores are made of stacked laminations stamped from electrical steel in the form of electrical steel sheets or electrical steel strips and used for rotors and/or stators of electric motors or generators. Within the laminated core, the overlapping laminations are connected with each other by means of an adhesive. In order to facilitate a light-activated adhesive to have sufficient adhesive strength, after the application of the adhesive, an activation path within the stamping device is required for the adhesive to exert its adhesive effect during the stacking process. The length of this activation path depends on the number of strokes of the punching tools in the stamping device. The higher this number of strokes, the longer the activation distance.

An object of the invention is to develop the method of the aforementioned kind and the application device of the aforementioned kind such that long activation sections within the stamping process or a subsequent activation for the adhesive during joining of magnets are not required.

SUMMARY OF THE INVENTION

In accordance with the invention, this object is achieved in regard to the method of the aforementioned kind in that a light-activated adhesive is used as the adhesive, which is irradiated and activated with light of the required wavelength immediately before exiting from an application unit.

In regard to the application device of the aforementioned kind, the object is solved according to the invention in that at least one application unit having at least one valve for discharging the adhesive is provided, wherein in the region of the valve at least one radiation source is provided, whose radiation is directed to the adhesive in the region of the valve.

In the method according to the invention, an adhesive is used, which can be activated by means of light. The light activation can take place here immediately before the adhesive exits from an application unit. In this case, the light can be used with a wavelength and/or intensity such that the adhesive is activated immediately after it leaves the application unit. Due to this procedure, an activation path is no longer required so that a system for carrying out the method has a correspondingly small structural size or length.

The joining of magnets in rotors is preferably carried out by gluing the magnets to the rotor core. For this purpose, preferably light-activated adhesives are used. They are activated after application by means of a UV-lamp.

Advantageously, the adhesive is irradiated in a supply line to a valve of the application unit. The light activation of the adhesive thus takes place within the adhesive supply line so that a simple activation of the adhesive is possible.

It is also possible to carry out the activation of the adhesive in a valve tappet of the valve of the application unit. In this case, the adhesive that is in the valve tappet is activated accordingly just before exiting the valve.

As a preferred adhesive, a UV adhesive is used which is irradiated with UV-light.

It is also possible to use adhesives which can be activated, for example, by electron irradiation. Other adhesives which can be activated by means of light and/or temperature are also suitable.

In a preferred process control, the adhesive is applied in the form of drops or lines to a plasma-pretreated surface. The drops or lines are applied where they are necessary for the adhesive bonding of adjacent laminations within the laminated core. Thus, the consumption of adhesive can be kept very low.

The plasma pretreatment cleans the strip used for the laminations and increases the surface energy of the strip. As a result, a better and reproducible adhesive wetting is achieved.

The adhesive is advantageously applied without contact so that a contamination of the valve of the application unit can be kept low.

According to a special procedure, the adhesive may be applied prior to the stamping operation. The laminations for forming the laminated core are punched subsequently.

But it is also possible to apply the adhesive after the stamping process, but before stacking to the laminated core. In this procedure, the position of the adhesive need not be taken into consideration when designing the punching tools.

In a preferred embodiment, the irradiation duration of the adhesive takes place as a function of the stroke rate of a punching tool. The higher the stroke rate of this punching tool, the longer the adhesive must be light-activated.

The application unit according to the invention is characterized in that at least one radiation source is provided in the region of the valve and its radiation is directed onto the adhesive in the region of the valve. As a result, the adhesive can be irradiated with the required light and thus activated just before it leaves the applicator unit.

In a preferred embodiment, the supply line for the adhesive in the region of the radiation emitted by the radiation source is designed such that the supply line is permeable to the radiation. The remaining area of the supply line is impermeable to the radiation so that the activation takes place only when the adhesive is in the radiation-permeable area of the supply line.

The radiation-permeable region of the supply line advantageously extends to the valve. As a result, the adhesive is exposed to light until it enters the valve and is discharged.

A simple change in the exposure time is possible by the fact that the radiation-permeable region can be covered by at least one cover which is impermeable to the radiation. With the cover, it is possible to change the length of the radiation-permeable supply area, whereby the exposure time is adjusted.

It is advantageous when the cover is infinitely adjustable. Thus, the exposure time can be very precisely adjusted by adjusting the radiation-impermeable cover.

In a preferred embodiment, the cover is ring-shaped, so that it surrounds the supply line for the adhesive.

In order to provide the adhesive easily at the intended location of the lamination, the valve is advantageously provided on a support which can be adjusted transverse to the feed direction of an electrical steel strip or an electrical steel sheet.

A preferred embodiment is characterized in that the application device has a frame in which at least two application units are accommodated. One application unit is located in the area above and the other application unit in the area below the electrical steel (strip or sheet), which is transported through the frame. As a result, the adhesive can be applied to both sides of the electrical steel strip or sheet.

Another simplified variant resides in that the adhesive is applied from one side. In this case, the adhesive is preferably applied to the top side.

The gist of the application results not only from the subject matter of the individual claims, but also from all the information and features disclosed in the drawings and the description. They are claimed, even if they are not the subject of the claims, as essential to the invention, as far as they are new individually or in combination over the prior art.

Further features of the invention will become apparent from the further claims, the description, and the drawing.

BRIEF DESCRIPTION OF THE DRAWINGS

The invention will be explained in more detail with reference to two embodiments shown in the drawings.

FIG. 5 is a schematic representation of another embodiment of an activation and application unit.

DESCRIPTION OF PREFERRED EMBODIMENTS

Figure 4:
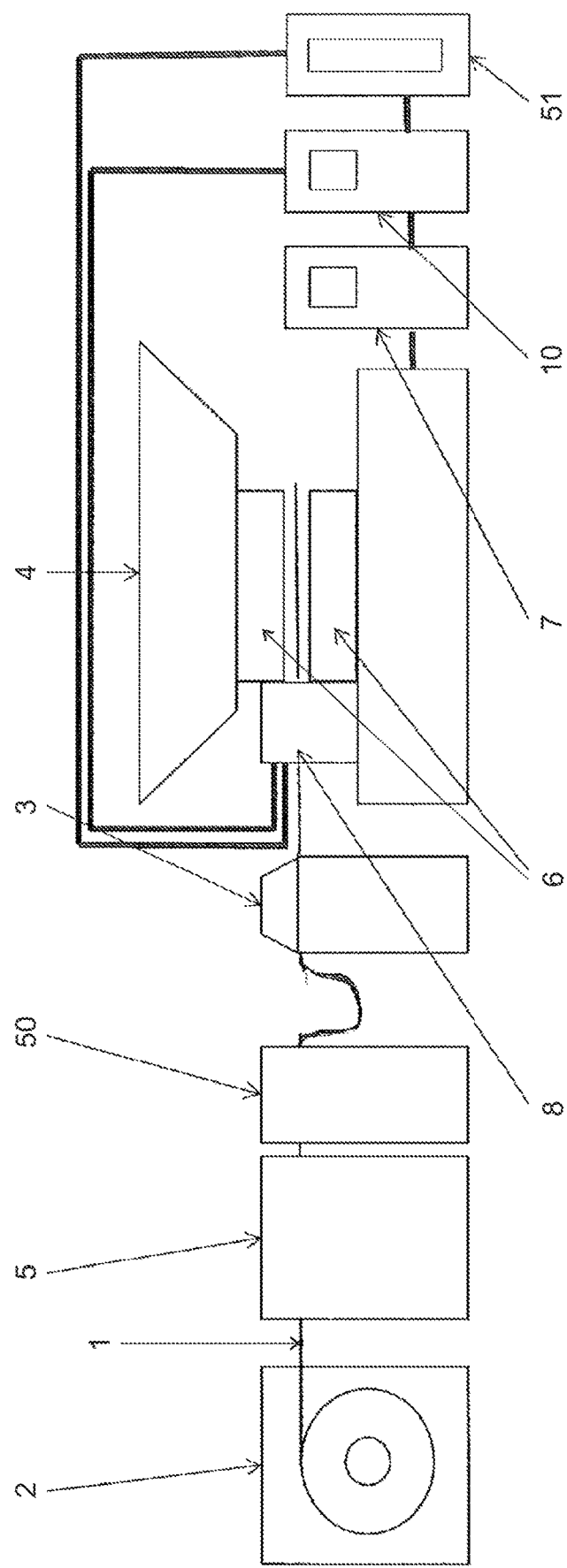
FIG. 4 is a schematic representation of a stamping device.

Laminations are punched out from an electrical steel strip 1 in a known manner and are stacked to lamination stacks (laminated cores) from which rotors and/or stators for electric drives or generators are made. The electrical steel strip 1 is unwound from a coil 2 (FIG. 4). By means of a feed 3, the electrical steel strip 1 is fed to a stamping device 4, with which the laminations are punched out of the electrical steel strip 1. Between the feed 3 and the coil 2, a straightening device 5 can be provided to straighten the electrical steel strip 1.

Furthermore, in the section of the strip feed, a plasma system 50 (FIG. 4) is provided for cleaning and setting the surface energy on the strip. In a preferred embodiment, the plasma nozzles are located within the punching process at a position in which the strip speed is constant. Here, at least one nozzle is arranged above the strip and one below with a defined distance of up to about 10 mm. The wetting of the adhesive is optimized by increasing the surface energy. As a result, the connection of the adhesive to the strip surface is improved. Thus, the adhesive is positionally more stable during the movement of the strip in the feed direction in the stamping process. In a preferred embodiment, the surface can be improved further by depositing activators through the plasma process.

The plasma system 50 is arranged in the feed direction of the electrical steel strip 1 before the stamping device 4. When the application unit has a straightening apparatus, then the plasma system 50 is advantageously located between the straightening apparatus and the stamping device 4.

The application unit 8 is connected to a schematically illustrated medium supply 51.

In the stamping device 4, there is the corresponding tool 6 with which the laminations are punched out from the electrical steel strips. The stamping device 4 is connected to a controller 7 with which the punching stroke is controlled.

The laminations are punched in a known manner in successive punching steps from the electrical steel strip 1. Depending on the width and/or shape of the laminations, the laminations can be punched out of the electrical steel strip 1 in one or more tracks.

Instead of an electrical steel strip, electrical steel sheets can also be used for punching the laminations.

The punched laminations are advantageously stacked in a shaft (not shown) within the punching device 4. In the shaft, there is a braking device, with which the laminations are held during stacking. Since such a stacking of the laminations within the punching device 4 is known, it will not be described here in detail.

There is also the possibility to stack the punched laminations outside the punching device 4. This procedure is known per se and is therefore not described in detail.

Figure 1:
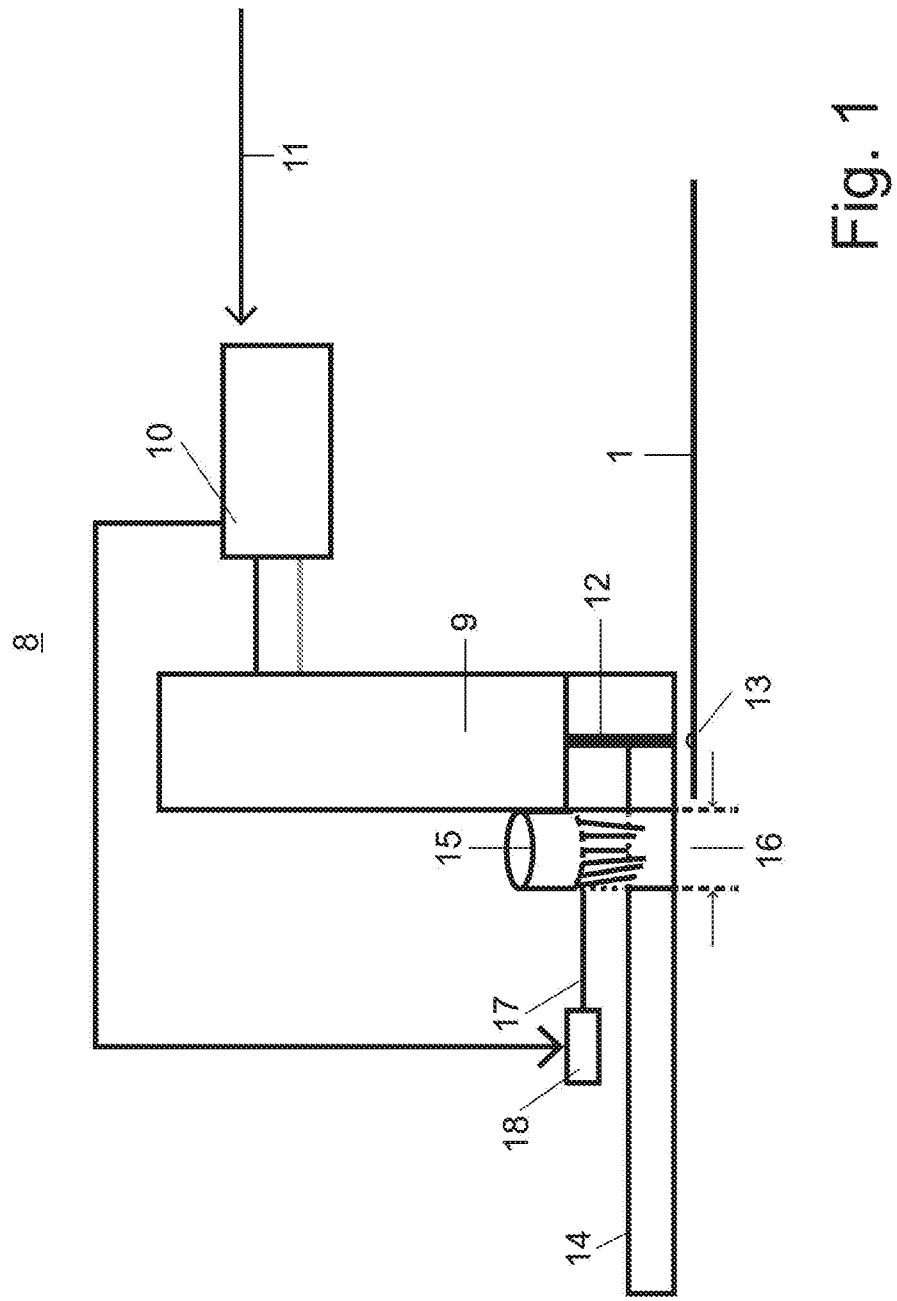
FIG. 1 is a schematic representation of an activation and application unit of an application device according to the invention.

In order to join the stacked laminations together, an adhesive is used which is applied to the laminations in a manner to be described. For application of adhesive, an application unit 8 is provided, which is schematically represented in FIG. 1. The application unit 8 has at least one valve 9 which is preferably a jet valve.

The valve 9 is connected to a controller 10, which controls the valve 9 in response to a supplied press signal 11.

The valve 9 has a valve tappet 12, by means of which the adhesive is applied to the electrical steel strip 1. In the illustrated embodiment, the adhesive is applied in the form of a drop 13 to the electrical steel strip 1.

The adhesive is supplied from a reservoir (not shown) via a supply line 14 to the valve tappet 12 with which the adhesive is applied to the electrical steel strip 1. The supply line 14 extends to the valve tappet 12.

An adhesive that can be activated by radiation of a suitable wavelength is used as the adhesive. Such an adhesive, for example, is a UV-adhesive that can be activated with UV-light. The UV radiation has a wavelength in the range between about 400 nm to 550 nm.

Other suitable photo-activated adhesives may be used, which are irradiated with light of a corresponding wavelength and activated therewith. For example, electron beams are also considered as light.

The corresponding radiation source 15 (FIG. 1), which may be, for example, a UV-light source, is arranged so that the radiation emitted by it reaches the adhesive located in the supply line 14 immediately before the valve 9 and activates the adhesive. Preferably, the radiation source 15 is annular so that it surrounds the supply line 14 in an annular manner. The axis of the annular radiation source 15 in this case forms the axis of the supply line 14. Of course, the light or radiation source 15 can also have a different form. It merely has to be configured such that the radiation emitted by it sufficiently activates the adhesive in the supply line 14.

In the radiation region of the radiation source 15, the supply line 14 is permeable to the radiation. When the adhesive is applied to the electrical steel strip 1, it is sufficiently activated by the radiation source 15 so that the adhesive can fulfill its bonding function in stacking the punched laminations to the lamination stack.

The exposure time depends on the size of the stroke rate of the punching device 4. The higher the stroke rate, the longer will be the exposure time of the adhesive in the supply line 14.

In order to obtain different activation times, the light source 15 is designed with a maximum exposure distance 16 relative to the longitudinal direction of the supply line 14 (FIG. 1). In the region of this exposure path 16, the supply line 14 is permeable to the radiation emitted by the radiation source 15.

The length of the exposure path 16 measured in the axial direction of the supply line 14 determines the maximum number of strokes of the punching device 4 or its tool 6.

When smaller stroke rates are used in the punching device 4, the exposure path 16 can be shortened, for example, by bringing a cover 17 between the supply line 14 and the radiation source 15. When the radiation source is advantageously annular, a corresponding annular cover is used. It is impermeable to the radiation emitted by the radiation source 15 so that the radiation only falls on the adhesive in the region not covered by the cover.

The smaller the number of strokes of the tool 6 in the punching device 4, the smaller the exposure distance 16 can be. Accordingly, the cover is advanced so far that only a small part of the radiation strikes the adhesive.

The adjustment of the cover 17 is advantageously motorized. The drive 18 for the cover 17 is advantageously connected to the controller 10. Since the press signals 11 are supplied to the controller 10, the controller 10 can actuate the drive 18 in response to the press signal 11 so that the cover 17 sets the length of the exposure path 16 according to the number of strokes.

In the illustrated embodiment, the radiation source 15 is located immediately adjacent to the valve 9. Thus, the application unit 8 builds short so that only a small installation space is required for the application unit 8. The radiation source 15 may also be provided at a distance from the valve 9. In this case, the radiation source 15 can be so configured that it emits the light into the region of the valve 9 for activation of the adhesive.

The radiation source 15 may also be arranged such that the light emitted by it falls on the valve tappet 12 of the valve 9 (FIG. 5). This results in the activation of the adhesive by the light immediately before its discharge from the valve 9. The supply line 14 for the adhesive in this case does not require a transparent area. Incidentally, the application unit is the same as that of the embodiment of FIG. 1.

In the above described embodiments, the valve 9 has only a single valve tappet 2. With such a valve 9, therefore, only one drop of adhesive 13 is applied to the electrical steel strip 1.

However, the valve 9 can also be so designed that it has two or more valve tappets 12. These valve tappets are arranged depending on the shape of the laminations to be punched. Then the adhesive drops can be applied to those points of the lamination which are optimal for the cohesion of the laminations within the laminated core.

The application unit 8 can be arranged in front of the stamping device 4 so that the laminations are punched out from the electrical steel strip 1 only after the adhesive has already been applied to the electrical steel strip at the required points.

However, it is also possible to arrange the application unit 8 downstream of the punching tool before the punched laminations reach the stacking shaft. The ejecting punch, with which the laminations are pressed into this shaft, is so designed that it does not come into contact with the adhesive drops 13 located on the laminations.

Figure 2:
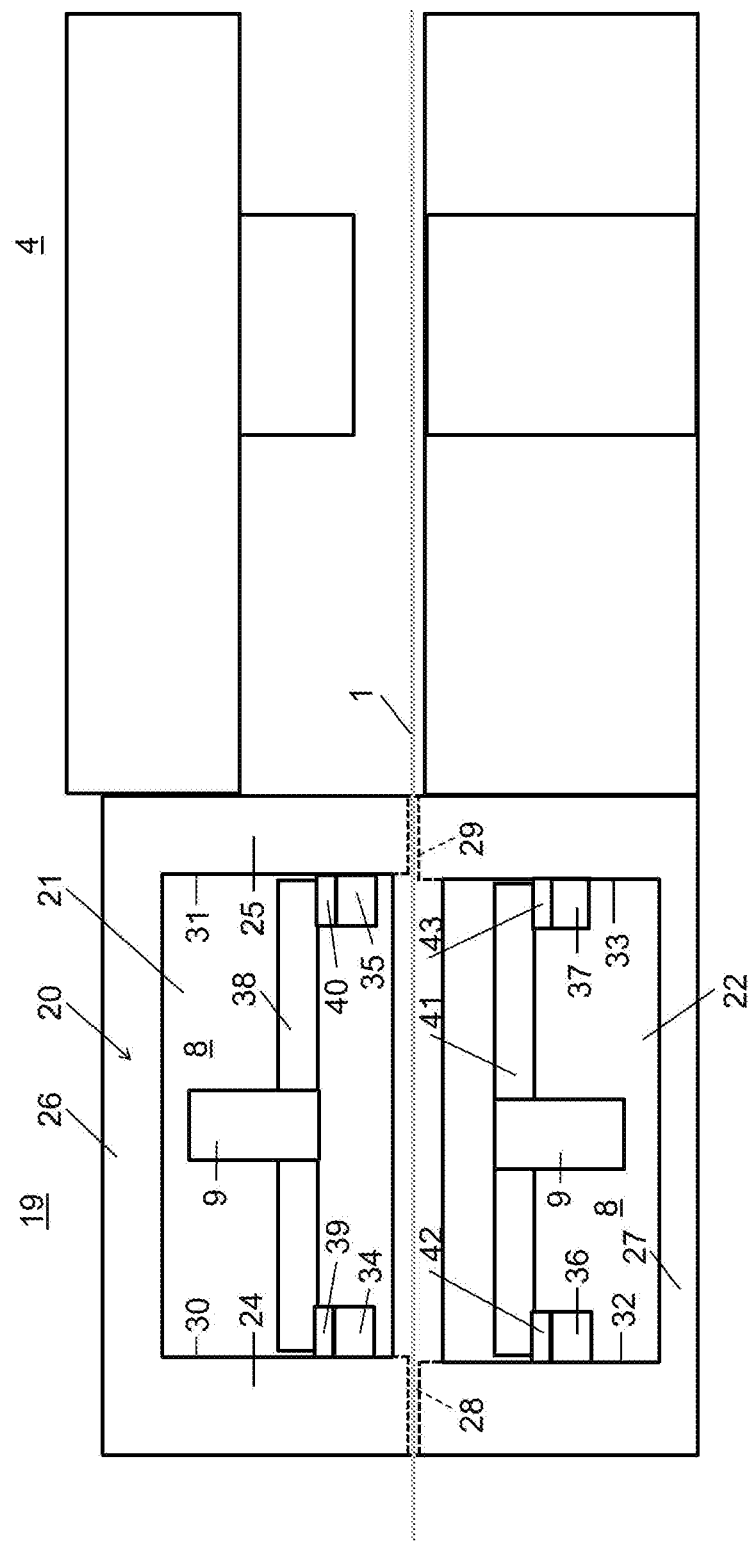
FIG. 2 is a schematic representation of another embodiment of an application unit of an application device according to the invention which is connected upstream to stamping equipment.

FIG. 2 shows a device 19 upstream of the stamping device 4; it has two application units 8 arranged in the region above and below the electrical steel strip 1.

The device has a portal-shaped frame 20 in which two receiving spaces 21, 22 are provided above each other, wherein each one accommodates an application unit 8.

The frame 20 has two mutually parallel vertical stands 24, 25 which are interconnected at the upper end by a cross member 26. The stands 24, 25 may be connected to each other at the lower end by another cross member 27.

The stand 24 comprises a schematically illustrated inlet opening 28 and the stand 25 comprises a schematically illustrated outlet opening 29 for the passage of the electrical steel strip 1.

In the two receiving spaces 21, 22, horizontally extending rails 34, 35; 36, 37 are attached to the opposite inner sides 30, 31; 32, 33 of the stands 24, 25. The rails 34 to 37 extend parallel to the electrical steel strip 1. A valve plate 38 is mounted on the rails 34, 35 and can be moved horizontally along the rails 34, 35 transverse to the feed direction of the electrical steel strip 1. The valve plate 38 carries the valve 9 with the valve tappet (not shown). Advantageously, the valve plate 38, with the interposition of at least one spring element 39, 40, is mounted as a decoupling element on the rails 34, 35. The valve 9 is adjustable in the height direction relative to the valve plate 38 in order to set the distance between the valve 9 and the electrical steel strip 1.

A valve plate 41 is also mounted on the rails 36, 37 in the lower receiving space 22. The valve plate 41 is also advantageously resting on the rails 36, 37 with the interposition of at least one spring element 42, 43 as a decoupling element. The valve plate 41 carries the valve 9 which is mounted to be adjustable in the height direction in the valve plate 41.

The two valve plates 38, 41 with the valve 9 are arranged in mirror image to each other.

With the two application units 8, the adhesive can be applied on the top and bottom side of the electrical steel strip 1. By moving the valve plate 38, 41, the position of the adhesive drops 13 on the electrical steel strip 1 can be determined.

Both application units 8 are advantageously identical. In principle, the application units 8 can also have a different design.

As has been explained by way of example with reference to FIGS. 1 and 5, the two application units 8 each have at least one radiation source 15 in order to activate the adhesive with light of the required wavelength before the adhesive is applied to the electrical steel strip 1.

The electrical steel strip 1 provided with the adhesive drops 13 then passes into the stamping device 4, with which the laminations are punched out from the electrical steel strip 1 in a known manner.

Figure 3:
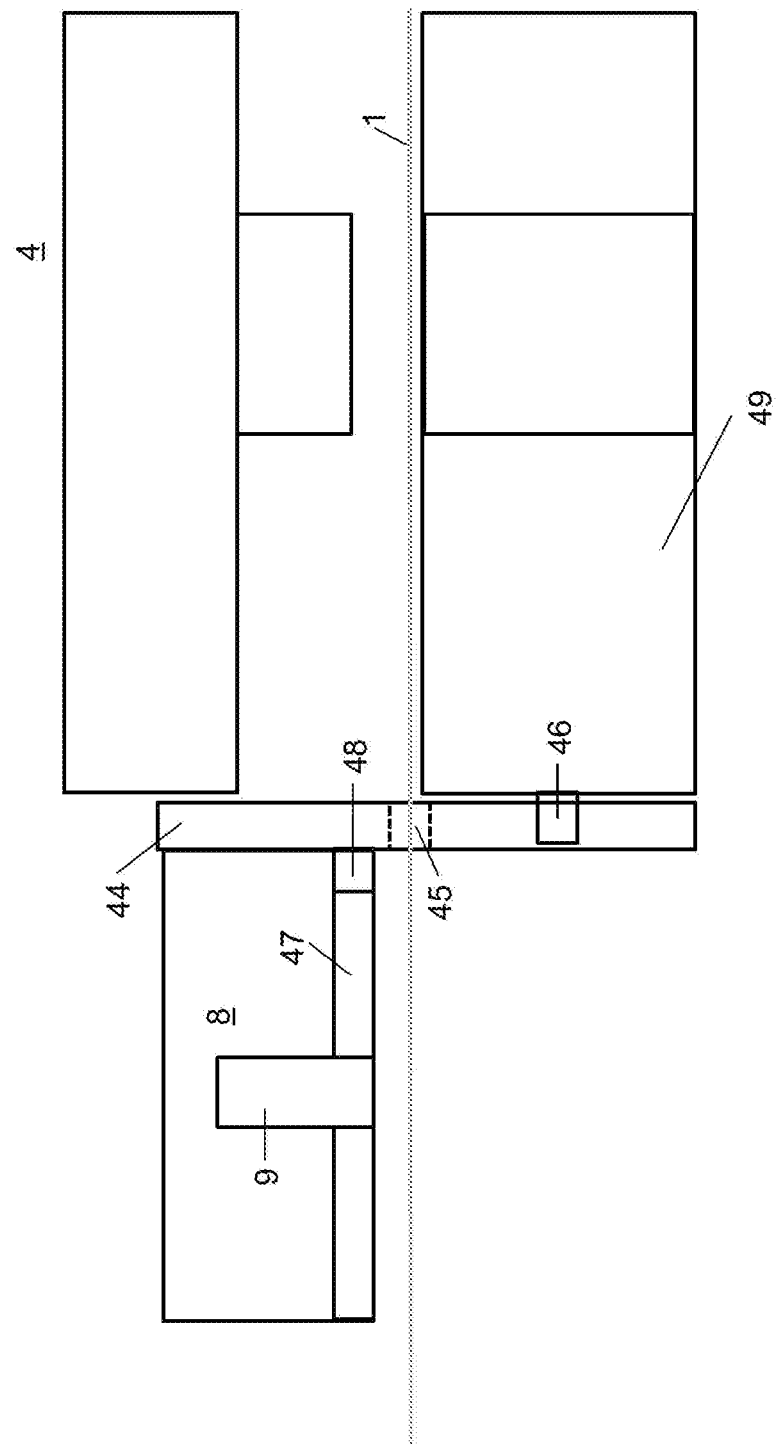
FIG. 3 is a schematic representation of another embodiment of an application unit of an application device according to the invention, which is connected upstream of a stamping device.

In the embodiment of FIG. 3, the frame 44 is a vertical stand. A schematically illustrated inlet opening 45 for the passage of the electrical steel strip 1 is provided therein. On the stand 44, a valve plate 47 is mounted which can be moved horizontally along rails 46 transverse to the feed direction of the electrical steel strip 1. The rails 46 are fastened to a tool bottom part 49 of the stamping device 4 and extend parallel to the electrical steel strip 1. The valve plate 47 carries the valve 9 with the valve tappet (not shown). Advantageously, the valve plate 47 is mounted on the stand 44 with the interposition of at least one spring element 48 as a decoupling element. The valve 9 is advantageously adjustable in vertical direction relative to the valve plate 47 in order to be able to set the distance between the valve 9 and the electrical steel strip 1.

With at least one application unit 8, the adhesive can be applied to the top side of the electrical steel strip 1. By moving the valve plate 47, the position of the adhesive drops 13 on the electrical steel strip 1 can be determined. In contrast to the embodiment according to FIG. 2, the application unit 8 is provided only in the region above the electrical steel strip 1. It has at least one radiation source 15 (FIGS. 1 and 5) to activate the adhesive in the manner described.

The specification incorporates by reference the entire disclosure of German priority document 10 2018 003 345.8 having a filing date of 23 Apr. 2018.

While specific embodiments of the invention have been shown and described in detail to illustrate the inventive principles, it will be understood that the invention may be embodied otherwise without departing from such principles.

What is claimed is:

1. A method for producing a lamination stack for rotors and/or stators of electric motors or generators, the method comprising:
    punching laminations with a punching tool;
    applying a light-activated adhesive, activatable by a light of a required wavelength, via a supply line of an application unit to at least one side of the laminations, respectively;
    providing a radiation source with an exposure path having a length extending relative to a longitudinal direction of the supply line;
    providing the supply line, in a region facing the exposure path of the radiation source, with a radiation-permeable region that is permeable to a radiation emitted by the radiation source;
    providing an adjustable cover between the supply line and the radiation source, wherein the adjustable cover is impermeable to the radiation emitted by the radiation source;
    activating the adhesive immediately before the adhesive exits from the supply line of the application unit by irradiating the adhesive with the light of the required wavelength emitted by the radiation source along the exposure path;
    adjusting, as needed, the adjustable cover to shorten said length of the exposure path so that the light of the required wavelength emitted by the radiation source only falls on the adhesive in an area of the radiation-permeable region of the supply line not covered by the adjustable cover;
    stacking the laminations to a lamination stack, wherein the laminations in the lamination stack are connected to each other by the adhesive.

2. The method according to claim 1, further comprising activating the adhesive for fixing magnets on the lamination stack forming a rotor.

3. The method according to claim 1, wherein the radiation-permeable region of the supply line extends to a valve of the application unit or in a valve tappet of a valve of the application unit.

4. The method according to claim 1, wherein the adhesive is a UV-adhesive and the light of the required wavelength is UV-light.

5. The method according to claim 1, wherein in the step of applying the adhesive is applied as a drop.

6. The method according to claim 1, wherein in the step of applying the adhesive is applied contactless.

7. The method according to claim 1, wherein an irradiation time in the step of activating the adhesive depends on a stroke rate of the punching tool for punching the laminations.

8. The method according to claim 1, further comprising the step of plasma treating an electrical steel prior to punching the laminations to adjust a surface energy of the electrical steel and activate a surface of the electrical steel.

9. The method according to claim 1, wherein the adhesive is applied before or after Joining of magnets.

10. The method according to claim 1, wherein an irradiation time in the step of activating the adhesive is dependent on a joining time of magnets or a working time of the adhesive.

11. A method for producing a lamination stack for rotors and/or stators of electric motors or generators, the method comprising:
    applying a light-activated adhesive, activatable by a light of a required wavelength, via a supply line of an application unit to at least one side of electrical steel;
    providing a radiation source with an exposure path having a length extending relative to a longitudinal direction of the supply line;
    providing the supply line, in a region facing the exposure path of the radiation source, with a radiation-permeable region that is permeable to a radiation emitted by the radiation source;
    providing an adjustable cover between the supply line and the radiation source, wherein the adjustable cover is impermeable to the radiation emitted by the radiation source;
    activating the adhesive immediately before the adhesive exits from the supply line of the application unit by irradiating the adhesive with the light of the required wavelength emitted by the radiation source along the exposure path;
    adjusting, as needed, the adjustable cover to shorten said length of the exposure path so that the light of the required wavelength emitted by the radiation source only falls on the adhesive in an area of the radiation-permeable region of the supply line not covered by the adjustable cover;
    subsequently punching laminations from the electrical steel by a punching tool;
    stacking the laminations to a lamination stack, wherein the laminations in the lamination stack are connected to each other by the adhesive.

12. The method according to claim 11, wherein the radiation-permeable region of the supply line extends to a valve of the application unit or in a valve tappet of a valve of the application unit.

13. The method according to claim 11, wherein an irradiation time in the step of activating the adhesive depends on a stroke rate of the punching tool for punching the laminations.

14. The method according to claim 11, further comprising the step of plasma treating an electrical steel from which the laminations are to be punched prior to applying the adhesive to thereby adjust a surface energy of the electrical steel and activate a surface of the electrical steel.

15. The method according to claim 11, wherein the adhesive is applied before or after joining of magnets.

16. The method according to claim 11, wherein an irradiation time in the step of activating the adhesive is dependent on a joining time of magnets or a working time of the adhesive.

* * * * *